US011319160B2

(12) United States Patent
Banasiak et al.

(10) Patent No.: US 11,319,160 B2
(45) Date of Patent: May 3, 2022

(54) CATENARY TROUGHING IDLER

(71) Applicant: LORAM TECHNOLOGIES, INC., Georgetown, TX (US)

(72) Inventors: Tom Banasiak, Austin, TX (US); Joshua A. Graham, Austin, TX (US); Charles W. Aaron, Georgetown, TX (US)

(73) Assignee: Loram Technologies, Inc., Georgetown, TX (US)

( * ) Notice: Subject to any disclaimer, the term of this patent is extended or adjusted under 35 U.S.C. 154(b) by 0 days.

(21) Appl. No.: 17/164,200

(22) Filed: Feb. 1, 2021

(65) Prior Publication Data

US 2021/0155412 A1 May 27, 2021

Related U.S. Application Data

(63) Continuation-in-part of application No. 16/696,973, filed on Nov. 26, 2019, now Pat. No. 10,941,003.

(60) Provisional application No. 62/774,992, filed on Dec. 4, 2018.

(51) Int. Cl.
*B65G 39/04* (2006.01)
*B65G 39/12* (2006.01)
*B65G 39/14* (2006.01)

(52) U.S. Cl.
CPC .................................. *B65G 39/14* (2013.01)

(58) Field of Classification Search
None
See application file for complete search history.

(56) References Cited

U.S. PATENT DOCUMENTS

| | | | |
|---|---|---|---|
| 2,781,124 | A | 2/1957 | Troller |
| 2,876,890 | A | 3/1959 | George |
| 4,011,938 | A | 3/1977 | Kain |
| 4,144,964 | A | 3/1979 | Valcalda |

(Continued)

FOREIGN PATENT DOCUMENTS

| | | |
|---|---|---|
| AT | 221417 B | 5/1962 |
| GB | 806605 A | 12/1958 |

OTHER PUBLICATIONS

International Searching Authority; International Search Report and Written Opinion for Application No. PCT/US2019/063651 dated Mar. 26, 2020.

(Continued)

*Primary Examiner* — Kavel Singh
(74) *Attorney, Agent, or Firm* — Parsons Behle & Latimer

(57) ABSTRACT

A catenary idler comprises a cable, a plurality of bearing surfaces disposed along a length of the cable, and a plurality of rollers disposed over the plurality of bearing surfaces. The plurality of bearing surfaces are fixed to the cable. The plurality of bearing surfaces may be a plurality of clamps. The plurality of rollers are rotatably supported upon the plurality of bearing surfaces. The cable may be rotatably supported at its ends. The catenary idler may include a first compression spring at a first end of the cable and a second compression spring at a second end of the cable. The rollers may be formed of an oil filled nylon. A conveyor belt impact bed includes a frame, a plurality of catenary idlers supported upon the frame, and a conveyor belt supported upon the plurality of catenary idlers.

20 Claims, 9 Drawing Sheets

(56) References Cited

U.S. PATENT DOCUMENTS

| | | | | |
|---|---|---|---|---|
| 4,166,528 A | * | 9/1979 | Renner | B65G 39/14 |
| | | | | 193/35 R |
| 4,196,805 A | | 4/1980 | Banno | |
| 4,301,109 A | | 11/1981 | Kain | |
| 4,720,007 A | | 1/1988 | Milek | |

OTHER PUBLICATIONS

U.S. Patent and Trademark Office; Office Action for U.S. Appl. No. 16/696,973 dated Jul. 9, 2020.
U.S. Patent and Trademark Office; Final Office Action for U.S. Appl. No. 16/696,973 dated Nov. 5, 2020.

* cited by examiner

CATENARY TROUGHING IDLER

RELATED APPLICATIONS

This application claims the benefit of U.S. patent application Ser. No. 16/696,973, filed on Nov. 26, 2019 and entitled "Catenary Troughing Idler," which claims the benefit of U.S. Provisional Patent Application Ser. No. 62/774,992, filed on Dec. 4, 2018 and entitled "Catenary Troughing Idler," the contents of which are incorporated herein by reference in their entireties.

FIELD OF THE DISCLOSURE

The embodiments described herein relate to handling materials, particularly a conveying system such as a conveyor belt impact bed that utilizes a high impact absorbing catenary idler. In particular, the embodiments described herein relate to catenary idlers for absorbing impact.

BACKGROUND

A catenary idler is a troughing idler that is not rigid, supported at its two ends, and is used to support a load on a carry side of a conveyor belt. Known catenary idlers are often inadequate to handle extremely high impact loads in applications where an impact bed is typically used or from very large aggregate dropped from several feet above. Known catenary idlers are generally of two types.

In a first type of catenary idler 10 (shown in FIG. 7), a shape is formed by connecting multiple rollers 15 to each other in series allowing at least one degree of pivot in a vertical axis at each connection point 14. Each roller 15 has a shaft 11 along its axis 12 that forms a link of the catenary idler 10 and a bearing 13 at each end of each roller 15, such that each roller 15 rotates about its shaft 11, but the shaft 11 does not rotate. For purposes of illustration, rollers 15 have been removed from the shafts 11 of the end links. When a roller 15 is damaged, the connection points 14 of the link are removed and replaced. In addition, the pivot connections may only permit limited movement in one axis and may contact each other at high troughing angles. Furthermore, these catenary idlers 10 may bind when friction from a conveyor belt induces friction in another axis, such as along the length of the conveyor belt, that is outside the range of motion permitted by the pivotal connection. Other disadvantages may exist.

In a second type of catenary idler 20 (shown in FIG. 8), a shape is formed by a steel cable 21 which has thrust bearings at its two ends, the cable 21 has rubber, plastic or urethane cast onto it in short cylindrical sections to form integral rollers 25, but the entire cable 21 rotates rather than the rollers 25 rotating about the cable 21. If a roller 25 is damaged, the roller 25 may be cut out and a new section of rollers 25 spliced into its place. However, this may create a weak spot in the catenary idler 20. In addition, if one section, such as section 26, of the catenary idler 20 is caused to rotate more quickly than another section, such as section 27, or in another direction, at least some of the rollers 25 may slide against the conveyor belt instead of roll. Also, a difference in rotational speeds between sections may induce a twist along the length of the cable 21. Other disadvantages may exist.

An impact bed 30 (shown in FIG. 9) consists of a rigid frame platform 31 that supports a conveyor belt (not shown) and usually has a stationary, low friction surface 32 that the conveyor belt can slide past. An impact bed 30 is confined to the loading zone of a conveying system and does not span the length of the entire conveyor belt. Other disadvantages may exist.

SUMMARY

The present disclosure is related to catenary idlers that overcome some of the problems and disadvantages discussed above. The catenary idlers may provide improved impact absorption associated with the loading procedures of certain conveying systems.

An embodiment of a catenary idler includes a cable with low friction, sliding, bearing surfaces for individual rollers distributed at a predetermined frequency along a length of the cable.

An embodiment of a catenary idler comprises a cable, a plurality of bearing surfaces disposed along a length of the cable, and a plurality of rollers disposed over the plurality of bearing surfaces. The plurality of bearing surfaces are fixed to the cable. The plurality of rollers are rotatably supported upon the plurality of bearing surfaces.

The catenary idler may include a first compression spring at a first end of the cable and a second compression spring at a second end of the cable. The catenary idler may include a washer disposed on the first end of the cable. The cable may pass through a center of the first compression spring. The first compression spring is disposed between the washer and a conveyor frame. The plurality of bearing surfaces may be a plurality of clamps. The plurality of clamps may be a plurality of metal clamps. The cable may be rotatably supported at its first end and its second end. The rollers may be formed of a material having a low coefficient of friction. The rollers may be formed of an oil impregnated nylon. The plurality of bearing surfaces may each have a concaved, cylindrical shape. The plurality of rollers may each include an inner bore. A diameter of the inner bore increases along a length of the roller away from a center of the roller. A first end of the cable may include a swaged fitting having an outer diameter. The inner bore of each of the plurality of rollers is greater than the outer diameter of the swaged fitting. One or more of the plurality of rollers may be supported upon adjacent bearing surfaces of the plurality of bearing surfaces.

An embodiment of a method of installing a catenary idler includes providing a cable, fixedly attaching a plurality of bearing surfaces along a length of the cable and disposing a plurality of rollers rotatably over the plurality of bearing surfaces, the plurality of rollers being supported upon the plurality of bearing surfaces.

The method may include supporting one or more of the plurality of rollers upon adjacent bearing surfaces of the plurality of bearing surfaces. The method may include slipping the plurality of rollers over a first end of the cable and sliding the plurality of rollers along the length of the cable. The method may include cutting out and removing a first roller of the plurality of rollers, the first roller being adjacent to a second roller of the plurality of rollers. The method may include sliding the second roller along the length of the cable to occupy a space previously occupied by the first roller.

An embodiment of conveying system includes a frame, a plurality of catenary idlers supported upon the frame, and a conveyor belt supported upon the plurality of catenary idlers. Each of the plurality of catenary idlers includes a cable, a plurality of bearing surfaces disposed along a length of the cable, the plurality of bearing surfaces being fixed to the cable, and a plurality of rollers rotatably disposed over the plurality of bearing surfaces, the plurality of rollers being supported upon the plurality of bearing surfaces.

An embodiment of a catenary idler includes a braided wire cable, a bearing layer surrounding the braided wire cable, and a plurality of rollers. The braided wire cable has an outer surface. The bearing layer surrounds the braided wire cable and is formed of a spiral wrap. An outer surface of the spiral wrap forms a plurality of bearing surfaces disposed along a length of the braided wire cable. The plurality of rollers each includes an inner bore extending along a length of the roller. The plurality of rollers are disposed over the plurality of bearing surfaces. The plurality of rollers are supported upon the plurality of bearing surfaces. The plurality of bearing surfaces provide contact surfaces for the inner bores of the plurality of rollers with the plurality of rollers being rotatable with respect to the plurality of bearing surfaces.

The spiral wrap of the bearing layer may be a metal spiral wrap. The spiral wrap of the bearing layer may be a single continuous piece extending along the length of the braided wire cable.

The catenary idler may include an impact absorption layer positioned between the bearing layer and the outer surface of the braided wire cable. The impact absorption layer may include a spiral wrap surrounding and contacting the outer surface of the braided wire cable. The spiral wrap of the impact absorption layer may be a plastic spiral wrap. The spiral wrap of the bearing layer may be a metal spiral wrap.

The spiral wrap of the impact absorption layer may be a first spiral wrap and the impact absorption layer may be a second spiral wrap surrounding and contacting the first spiral wrap. The second spiral wrap is positioned between the first spiral wrap and the spiral wrap of the bearing layer. The first spiral wrap and the second spiral wrap may be spiraled in opposite directions. The spiral wrap of the bearing layer and the second spiral wrap may be spiraled in opposite directions.

The braided wire cable may be rotatably supported at a first end of the braided wire cable and at a second end of the braided wire cable. Adjacent rollers of the plurality of rollers may be independently rotatable from each other. The plurality of rollers may be slidable with respect to the plurality of bearing surfaces along the length of the braided wire cable.

An embodiment of a method of configuring a catenary idler includes wrapping a spiral wrap of a bearing layer around a braided wire cable along a portion of a length of the braided wire cable. An outer surface of the spiral wrap of the bearing layer forms a plurality of bearing surfaces disposed along a length of the braided wire cable. The method includes disposing a plurality of rollers over the plurality of bearing surfaces. The plurality of rollers each include an inner bore extending along a length of the roller. The plurality of bearing surfaces contact the inner bores of the plurality of rollers with the plurality of rollers being rotatable with respect to the plurality of bearing surfaces.

The method may include disposing an impact absorption layer between the spiral wrap of a bearing layer and an outer surface of the braided wire cable. Disposing the impact absorption layer may include wrapping at least one spiral wrap of the impact absorption layer around the braided wire cable along the portion of the length of the braided wire cable. The at least one spiral wrap may be a plurality of spiral wraps and the spiral wrap of the bearing layer may be wrapped over an outermost wrap of the plurality of spiral wraps.

The method may include wrapping the plurality of spiral wraps of the impact absorption layer around the braided wire cable by wrapping a first spiral layer around the braided wire cable, the first spiral layer contacting the outer surface of the braided wire cable, and wrapping at least one second spiral layer over the first spiral layer.

The method may include wrapping adjacent wraps of the plurality of spiral wraps of the impact absorption layer in opposite directions. The method may include wrapping the spiral wrap of the bearing layer in a direction opposite from an outermost wrap of at least one spiral wrap of the impact absorption layer.

An embodiment of a catenary idler includes a frame, a conveyor belt, and a plurality of catenary idlers supported upon the frame. The conveyor belt is supported upon the plurality of catenary idlers. Each of the plurality of catenary idlers includes a braided wire cable, an impact absorption layer, a bearing layer, and a plurality of rollers. The braided wire cable has an outer surface. The impact absorption layer has a first spiral wrap wrapped around and contacting the braided wire cable and a second spiral wrap wrapped around and contacting the first spiral wrap. The bearing layer has a spiral wrap wrapped around and contacting the second spiral wrap of the bearing layer. An outer surface of the spiral wrap of the bearing layer forms a plurality of bearing surfaces disposed along a length of the braided wire cable. The plurality of rollers each include an inner bore extending along a length of the roller. The plurality of rollers are disposed over the plurality of bearing surfaces. The plurality of rollers are supported upon the plurality of bearing surfaces. The plurality of bearing surfaces providing contact surfaces for the inner bores of the plurality of rollers with the plurality of rollers being rotatable with respect to the plurality of bearing surfaces.

Figure 1:
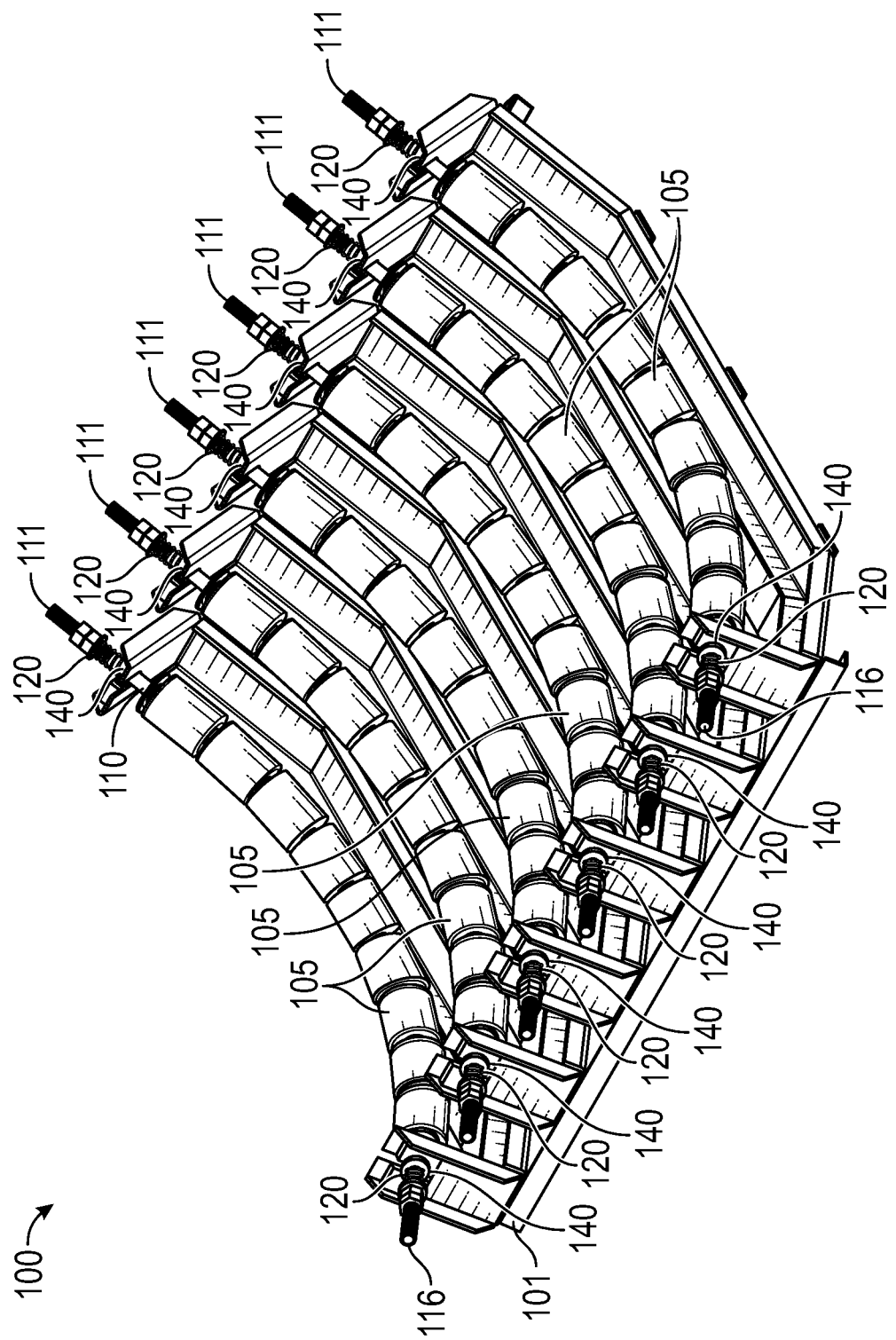
FIG. 1 shows an embodiment of a conveying system forming an impact bed.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DESCRIPTION

FIG. 1 shows an embodiment of a conveying system 100 including a plurality of catenary idlers 105 supported upon a frame 101. The catenary idlers 105 are each supported upon the frame 101 at a first end 111 and a second end 116. Each of the first end 111 and the second end 116 may be supported upon the frame 101 by an elastically deformable member, such as a compression spring 120. The elastically deformable member is configured to absorb a portion of an impact from materials being placed on the plurality of catenary idlers 105. Each of the first end 111 and the second end 116 may be supported upon the frame 101 by a thrust bearing 140. A conveyor belt 160 (shown in FIG. 2) is supported upon the plurality of catenary idlers 105 in order to carry a payload.

Figure 2:
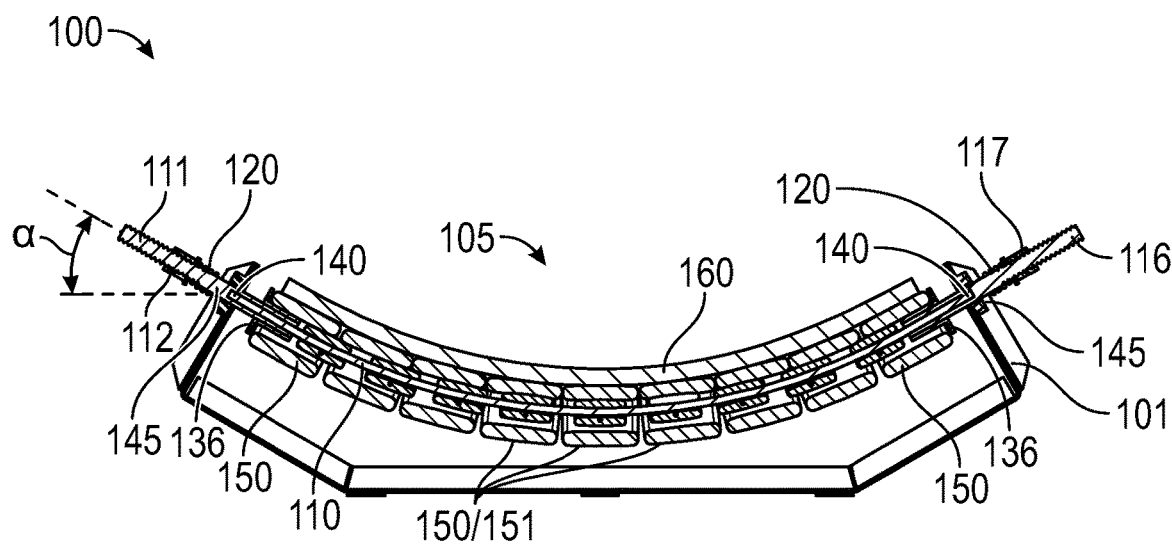
FIG. 2 shows a cross-sectional view of the embodiment of the conveying system of FIG. 1.
Figure 3:
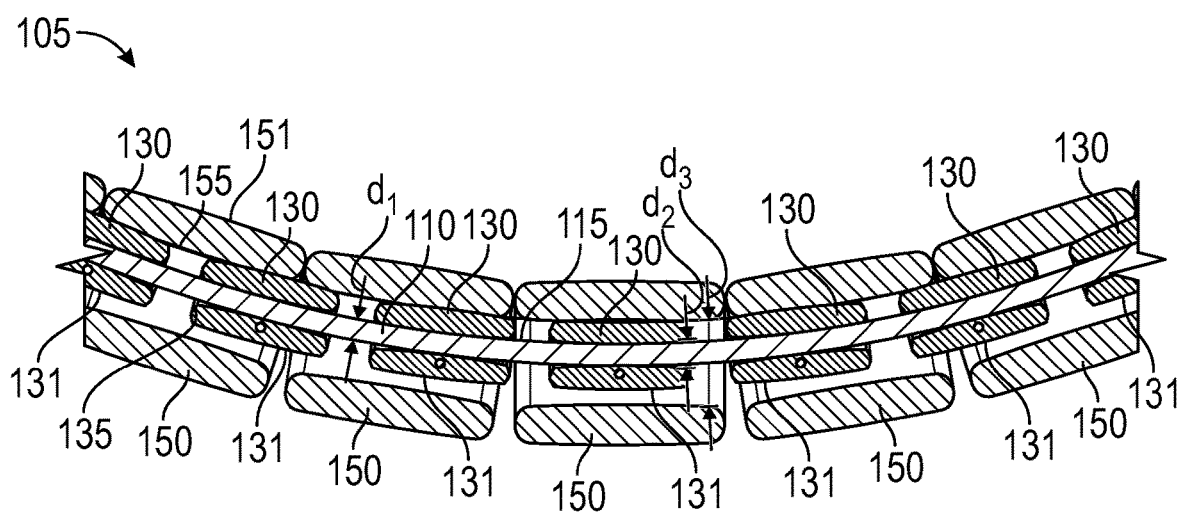
FIG. 3 shows a cross-sectional view of a portion of an embodiment of a catenary idler.

FIG. 2 shows a cross-sectional view of the conveying system 100. The plurality of catenary idlers 105 supported upon the frame 101 form a trough-shape. The conveyor belt 160 deforms with the shape of the catenary idlers 105. The catenary idlers 105 includes a length of a cable 110 extending between the first end 111 and the second end 116 of the catenary idlers 105. The cable 110 may be a twisted steel cable 110. FIG. 3 is a detailed view of a portion of the catenary idler 105. Referring to FIGS. 2 and 3, an embodiment of a catenary idler 105 includes bearing surfaces 131 distributed along the length of the cable 110 and a plurality of rollers 150 supported upon the bearing surfaces 131. The bearing surfaces 131 are fixed to the cable 110 such that they do not rotate with respect to the cable 110. The bearing surfaces 131 may be distributed along the length of the cable 110 in a predetermined frequency. For example, in some embodiments, a bearing surface 131 may be 3-inches in length and may be spaced on 4-inch centers may be used. The bearing surface 131 provides a low-friction, sliding surface for rollers 150 that form the shape of the catenary idler 105. The bearing surfaces 131 also prevent direct contact with and wear on the cable 110 by the rollers 150.

The bearing surfaces 131 may be cast upon the cable 110. In some embodiments, the bearing surfaces 131 may be clamps 130 having a circular outer cross-section. The bearing surfaces 131 may be a concaved, cylindrical shape. The clamps 130 may be formed of metal. An inner bore 135 of the clamp 130 is positioned around the outer surface 115 of the cable 110 and compressed to a width less than or equal to the diameter $d_1$ of the cable 110 in order to prevent movement of the clamp 130 with respect to the cable 110. A diameter $d_2$ of the inner bore 135 of the clamp 130 may increase along the length of the clamp 130 away from the center of the clamp 130 to permit the cable 110 to further conform to the trough shape. Adjacent rollers 150 can rotate independently from one another. Each of the rollers 150 are supported upon at least one bearing surface 131. In some instances, one or more of the plurality of rollers 150 may be supported upon a plurality of adjacent bearing surfaces 131. For example, a width of the rollers 150 may be selected such that the roller 150 is supported upon at least two bearing surfaces 131. The roller 150 may have a shape that conforms to the dynamics of a changing trough shape. The circular clamp 130 may also have a shape that conforms to the dynamics of a changing trough shape. The catenary idler 105 may have a troughing angle α of up to 90 degrees.

The rollers 150 and bearing surfaces 131 are formed of materials with a low coefficient of friction such that the rollers 150 are slidable and rotatable upon the bearing surfaces 131. As used herein, a low coefficient of friction is less than 0.25. Preferably, a material having a coefficient of friction of less than 0.1 may be used. The rollers 150 may be made of a self-lubricating composite material that produces low friction when it contacts the bearing surfaces 131 and has properties to absorb high impact forces. The rollers 150 may be formed of an oil impregnated nylon. In some embodiments, the rollers 150 may be formed of a thermoplastic polyethylene, such as ultra-high-molecular-weight polyethylene.

Figure 5:
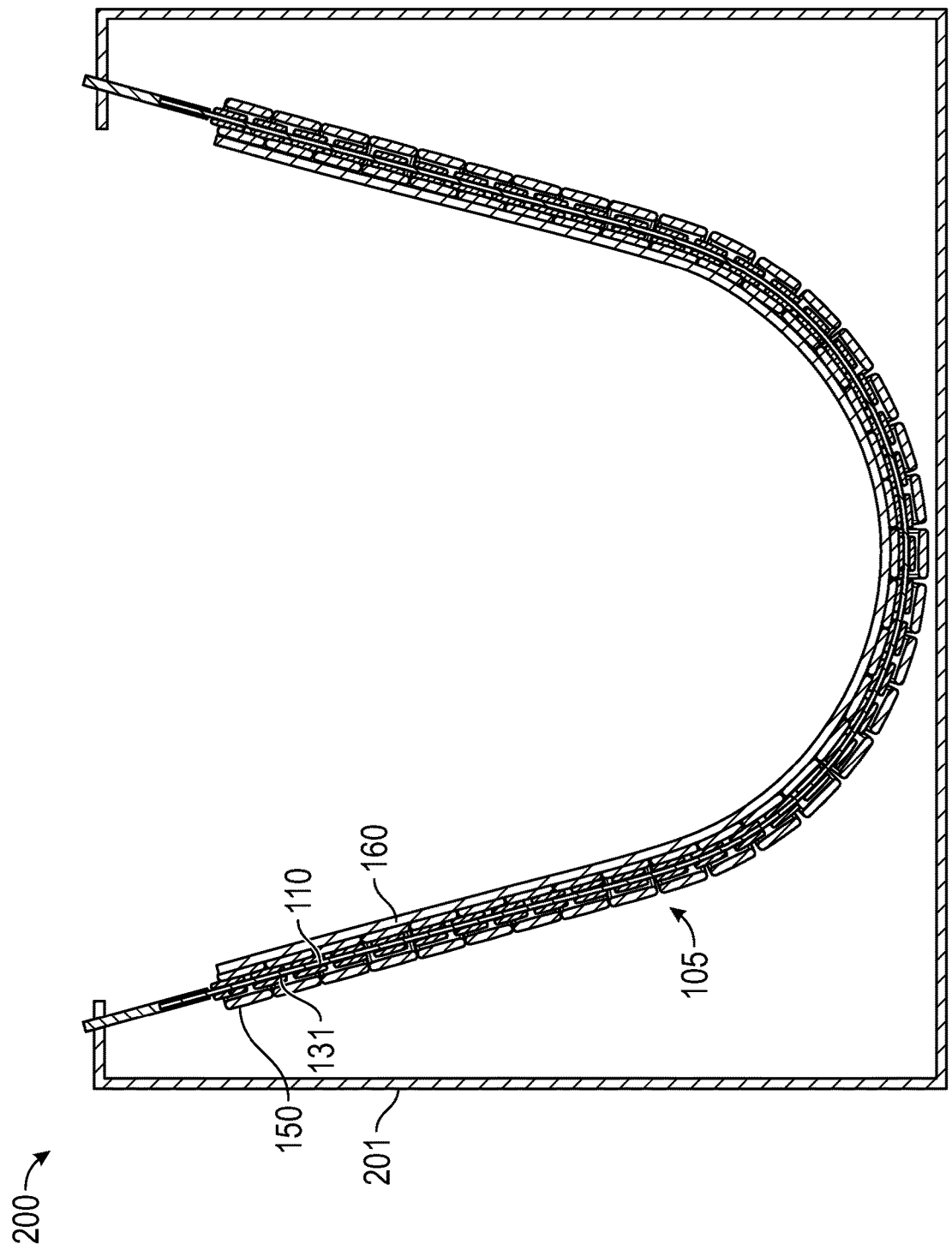
FIG. 5 shows an embodiment of a mobile conveying system.
Figure 7:
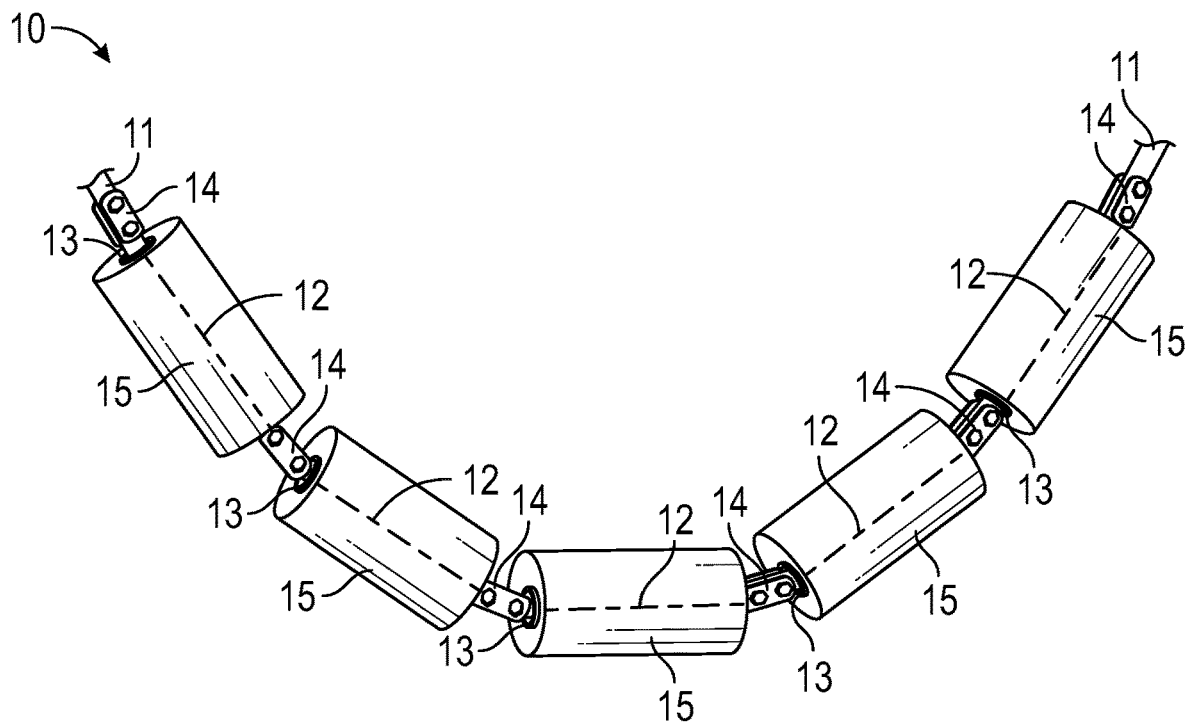
FIG. 7 shows a known catenary idler.
Figure 8:
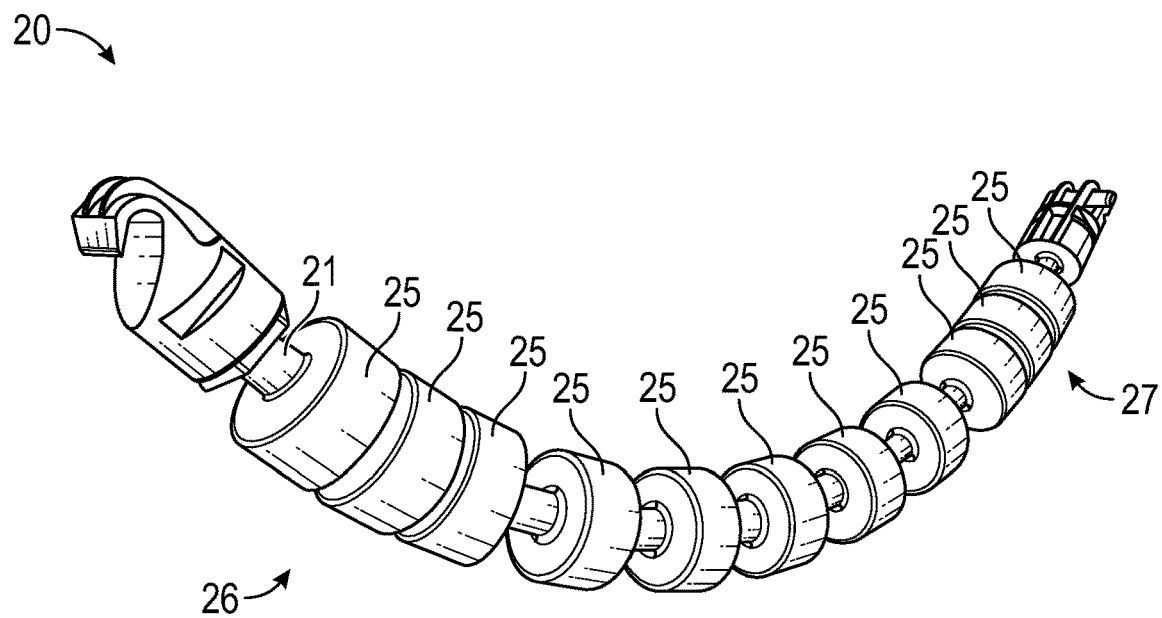
FIG. 8 shows a known catenary idler.
Figure 9:
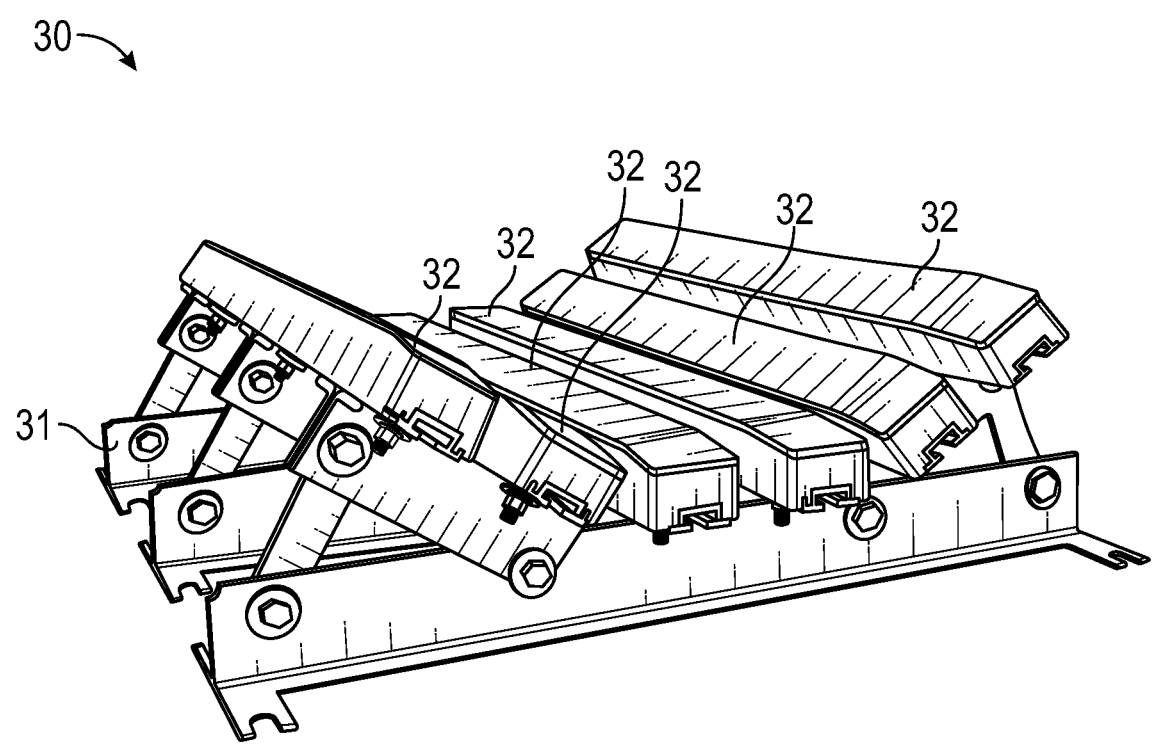
FIG. 9 shows a known impact bed.

The embodiments described herein may be advantageous as the entire length of a carrying side of a conveyor belt 160 could be utilized as a loading zone. For instance, large rock could be dropped several feet above the conveyor belt 160. In addition, the rollers 150 are able to rotate relative to each other independently. This may be particularly advantageous in composite belt configurations where different belt speeds are used. In addition, undesirable twist in the cable 110 may be minimized or eliminated since one section of the catenary idler 105 is able to rotate forward relative to the belt travel, while an opposing section is stationary or moves backward relative to the belt travel. Unlike some known catenary idlers 105, the embodiments described herein do not utilize a bearing 13 at each end of each roller 15 (shown in FIG. 7) and do not require rotation of all of the rollers 25 in unison (shown in FIG. 8). Additional advantages may be recognized in a mobile conveying system, wherein the conveyor frame 101 transitions from a straight section to a curved section, or forms a compound curve, such as the English letter "S". The outer edges of the conveyor frame 101 can change length relative to each other without inducing a twist in the catenary idler 105. Other examples of a mobile conveying system 200 (shown in FIG. 5) include railroad applications, such as railcar frame 201 supporting a plurality of catenary idlers 105 formed of a cable 110, bearing surfaces 131, and rollers 150. The lengths of the sides of a conveyor belt 160 may change as the railcar navigates curves on a railroad track.

Figure 4:
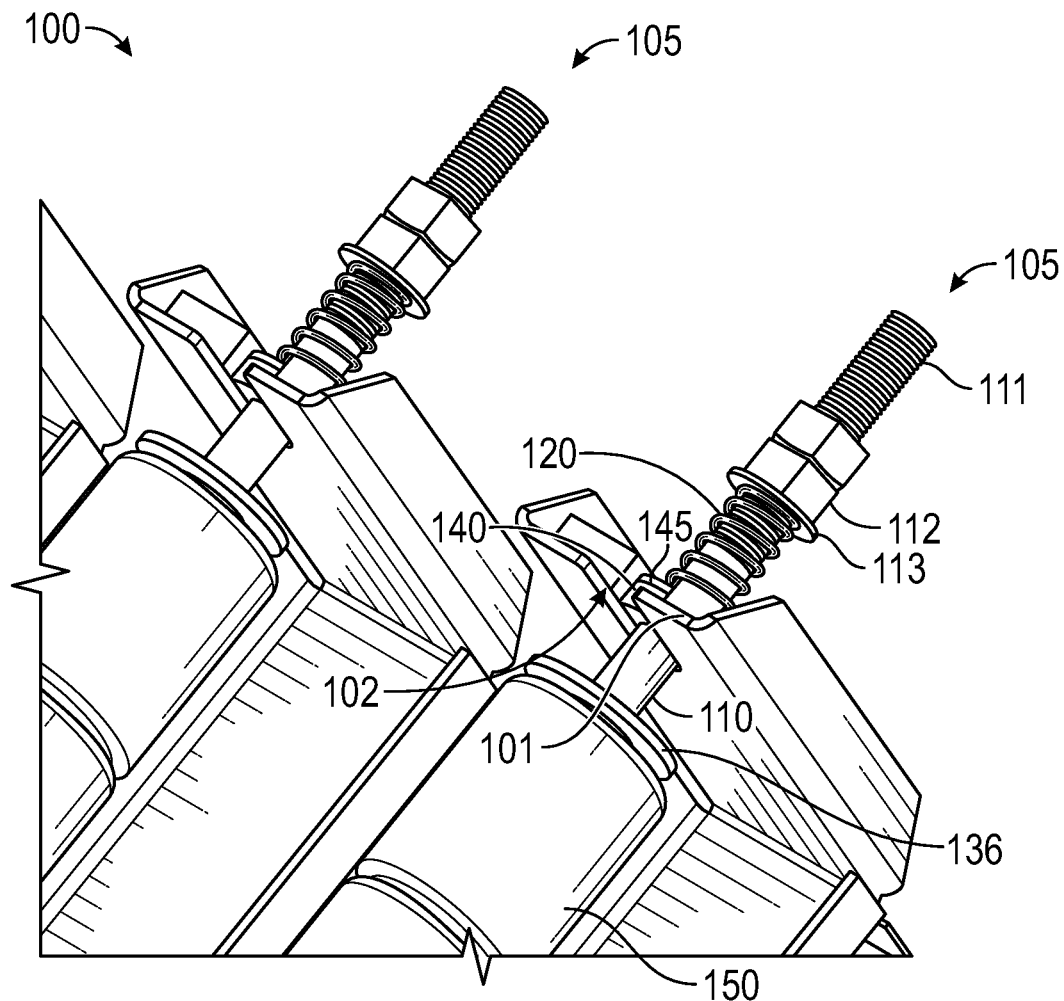
FIG. 4 shows a cross-sectional view of an end portion of the embodiment of the conveying system of FIG. 1.

FIG. 4 is a detailed view of an end portion of the conveying system 100. Referring to FIGS. 2 and 4, in some embodiments, the cable 110 is rotatably supported upon the frame 101 at the first end 111 and the second end 116. The cable 110 may be rotatably supported by a thrust bearing 140 at each end. The cable 110 may be rotatably supported by the thrust bearing 140 by an interface between a swaged fitting 145 and the thrust bearing 140. Additional advantages may be recognized in high rotational speed applications where the amount of slip between the rollers 150 and the bearing surfaces 131 are reduced by rotation of the cable 110. In some lower impact applications, the cable 110 may be supported by a thrust bearing 140 but not compression springs 120.

The cable 110 may include swaged fittings 145 on the first end 111 and/or the second end 116. The swaged fittings 145 may be used to connect the catenary idler 105 to the conveyor frame 101 of the conveying system 100. Other types of connectors may be used.

In some embodiments, the ends of the cable 110 may each be supported upon a compression spring 120. The ends of the cable 110 may be connected to a washer 113 with the cable 110 extending through an opening 102 in the conveyor frame 101. A compression spring 120, such as a coiled spring, is disposed between the washer 113 and the conveyor frame 101. The first end 111 of the catenary idler 105 may be threaded to receive a nut 112 and/or the second end 116 of the catenary idler 105 may be threaded to receive a nut 117, which can be tightened to adjust the preload on the compression springs 120. Additional advantages may be recognized in high impact applications where the impact upon the catenary idlers 105 pulls downward upon the washer 113 and compresses the compression spring 120. In some lower speed applications, the cable 110 may be supported only upon compression springs 120 but not thrust bearings 140.

In some high impact, high rotational speed applications, the cable 110 may be supported upon both compression springs 120 and thrust bearings 140. In some low impact, low rotational speed applications, the cable 110 may be supported upon neither compression springs 120 nor thrust bearings 140.

In some embodiments, a troughing angle α of between 15 and 45 degrees is used. A plurality of catenary idlers 105 are spatially separated along the length of a conveying system 100. The conveying system 100 may form an impact bed. The plurality of catenary idlers 105 may be positioned with the cables 110 spaced approximately 1.5-4 times the outer diameter of the rollers 150 to form a high impact loading zone of a conveying system 100. This configuration may provide lower friction than known impact beds. The plurality of catenary idlers 105 may be positioned under a portion of a conveyor belt 160 (shown in FIG. 2) located under a loading chute.

In use, the catenary idlers 105 may be utilized to support a payload, such as aggregate on a conveyor belt 160. Heavy materials may be loaded anywhere along the length of the conveyor belt 160. As materials are dropped upon the conveyor belt 160, the weight is distributed through the catenary idlers 105. The impact force may be transmitted through the cable 110 and into the compression springs 120 located at the opposing ends 111, 116 of the cable 110.

As the conveyor belt 160 begins rotation, the conveyor belt 160 slides or rolls along the rollers 150. End caps 136 may be placed between the rollers 150 and the frame 101 to prevent the rollers 150 from contacting the frame 101. As the friction between the conveyor belt 160 and the rollers 150 increases, the rollers 150 begin to rotate upon the bearing surface 131 with the bearing surface 131 remaining stationary relative to the cable 110. In embodiments where the cable 110 is rotatably supported upon the frame 101, the rotation of the rollers 150 upon the bearing surfaces 131 and the rotation of the cable 110 (and thereby the bearing surfaces 131 disposed on the cable 110) rotate together to reduce resistance to the conveyor belt 160. Depending upon the resistance between the rollers 150 and the bearing surfaces 131 and in the thrust bearings 140, the catenary idler 105 reaches a state of equilibrium. For instance, the static friction between the rollers 150 and the bearing surfaces 131 may be greater than the static friction of the thrust bearings 140, causing the thrust bearings 140 (and thereby the cable 110) to begin rotation first. As the conveyor belt 160 and the bearing surfaces 131 exert force upon the rollers 150, the rollers 150 may begin to rotate. In other embodiments, the rollers 150 may begin rotation before the cable 110. Through the simultaneous rotation of both the rollers 150 and the cable 110, greater rotational speeds of the conveyor belt 160 may be achieved.

Figure 6:
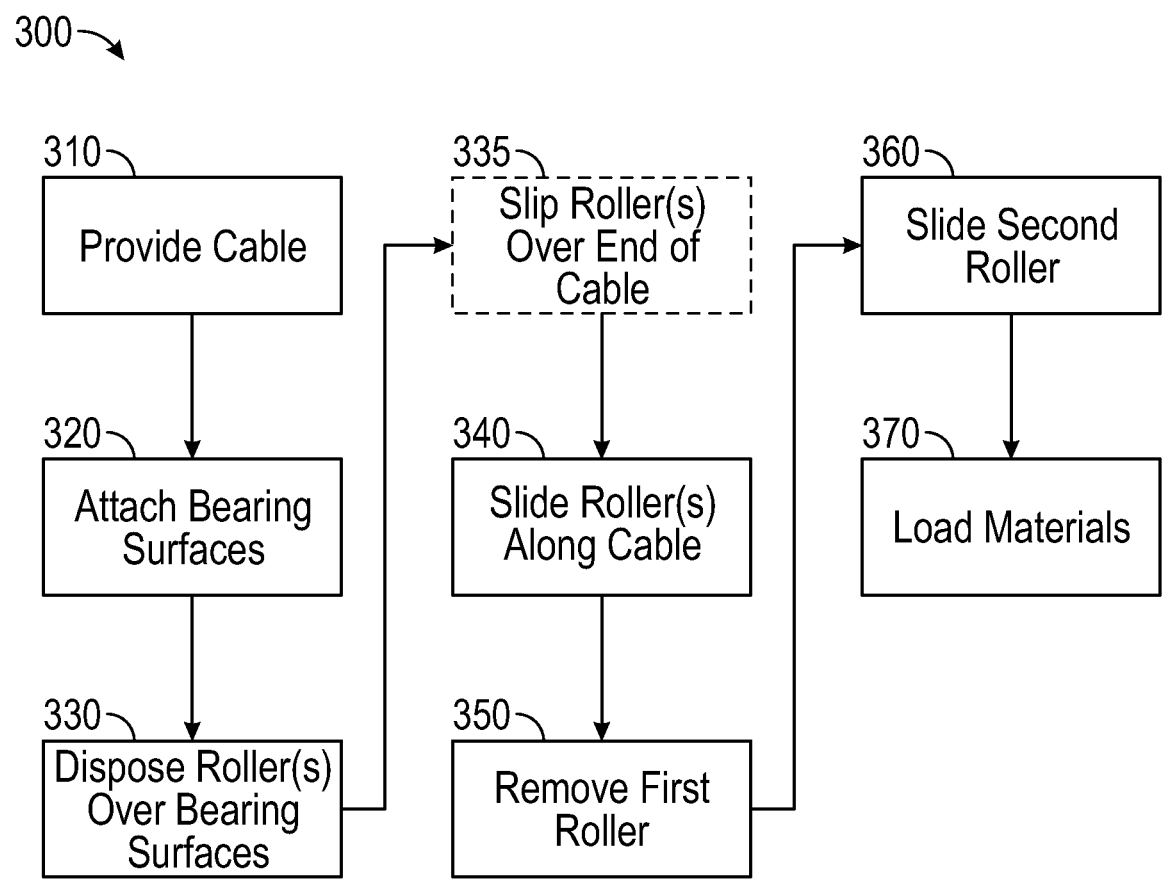
FIG. 6 illustrates an embodiment of a method of configuring a conveying system.

FIG. 6 illustrates an embodiment of a method 300 of configuring a conveying system 100. The method 300 includes providing 310 a cable 110. The installation of a catenary idler 105 may include cutting a cable 110 to length and swaging a first end 111. A plate, such as a washer 113 is supported against the swaged fitting 145 and the cable 110 is threaded downward through the center of a compression spring 120 and a conveyor frame 101. Method 300 includes fixedly attaching 320 bearing surfaces 131 along a length of the cable 110. Clamps 130 may be fixed to the cable 110 at a predetermined frequency along a length of the cable 110 to form the bearing surfaces 131. The clamps 130 may include a concaved surface to form the trough shape of the catenary idler 105. The use of clamps 130 may be advantageous as to increase the repairability of a catenary idler 105 in the event of a component failure. In some embodiments, bearing surfaces 131 may be created by casting upon the cable 110, rather than by clamps 130. The second end 116 of the cable 110 may be swaged with the bearing surfaces 131 already formed along the cable 110.

Method 300 includes disposing 330 the rollers 150 over the bearing surfaces 131 and sliding 340 the rollers 150 along the length of the cable 110 to form the trough shape of the catenary idler 105. In some embodiments, disposing 330 the rollers 150 may comprise slipping 335 the rollers 150 over one of the swaged ends of the cable 110. An inner bore 155 of the roller 150 may be larger than the swaged fitting 145 to permit the roller 150 to pass over the swaged end. The inner bore 155 of the rollers 150 is received over the clamps 130. The inner bore 155 of the rollers 150 may have a concave shape corresponding to the concave shape of the clamps 130. A diameter $d_3$ of the inner bore 155 of the rollers 150 may increase along the length of the roller 150 away from the center of the roller 150 to assist with movement of the rollers 150 laterally across the clamps 130, such as in curved sections of the trough shape. The rollers 150 may include a concaved outer surface 151 to support the conveyor belt 160 and form the trough shape of the catenary idler 105.

If a roller 150 becomes damaged, method 300 may include removing 350 a first roller 150, sliding 360 a second roller 150 into its place, and loading materials 370 onto the replaced roller 150. For instance, a roller 150 near the middle of the catenary idler 105 may be cut out and adjacent rollers 150 may be moved along the length of the cable 110 to fill a space previously occupied by the removed roller 150. A new roller 150 may be slipped over the swaged fitting 145 in order to maintain the total number of rollers 150.

Figure 10:
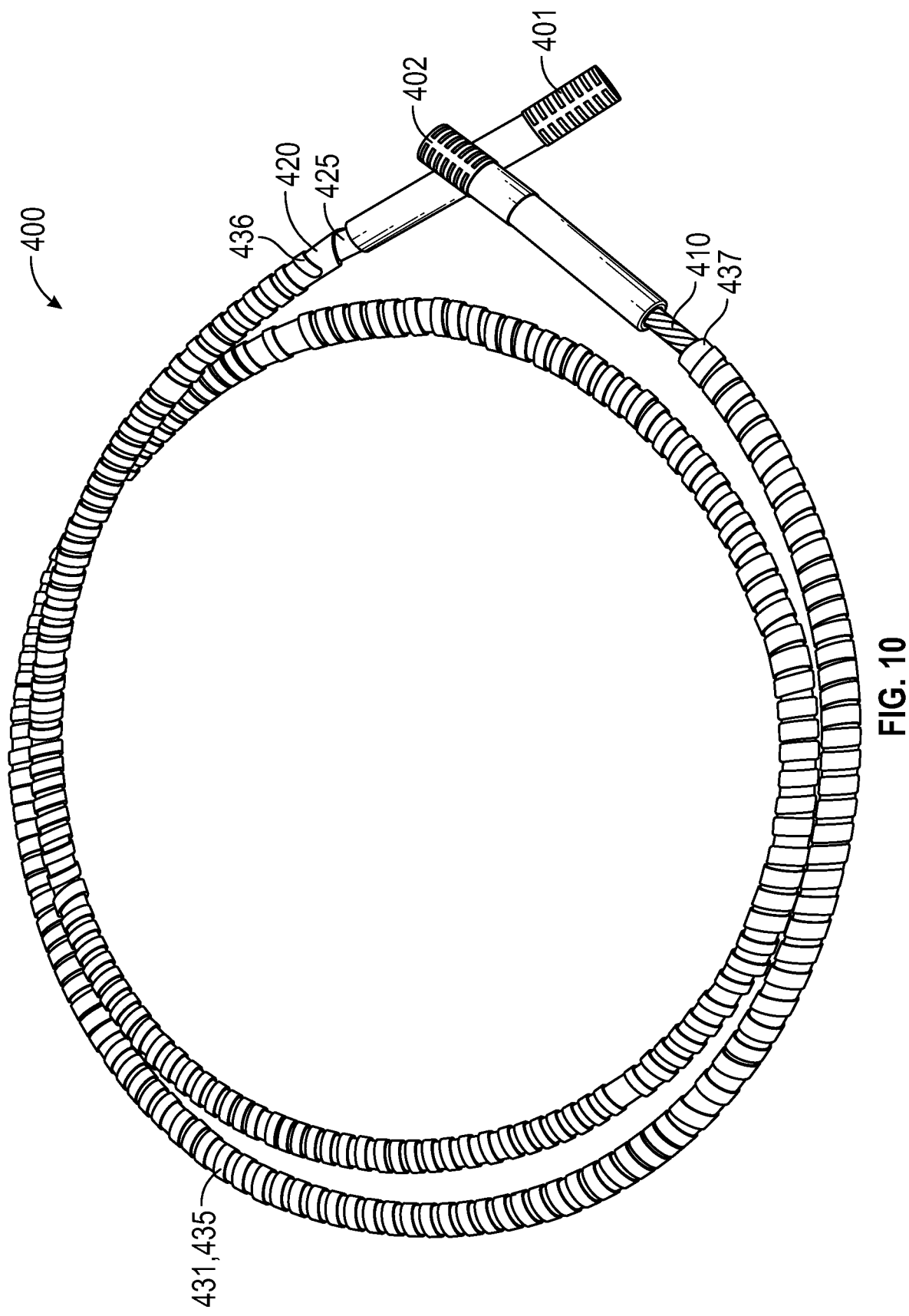
FIG. 10 illustrates an embodiment of a bearing cable.

FIG. 10 illustrates an embodiment of a bearing cable 400 that may be used with conveying system 100 in place of cable 110 and clamps 130. Bearing cable 400 provides integrated bearing surfaces 431. Bearing cable 400 has a length extending from a first end 401 to a second end 402. First end 401 and second end 402 are configured to be received and supported by frame 101 of conveying system 100. Bearing cable 400 may be rotatably supported upon the frame 101 at the first end 401 and the second end 402. Bearing cable 400 includes a bearing portion 435 extending along a portion of the length of bearing cable 400 between a first bearing portion end 436 and a second bearing portion end 437. Bearing cable 400 includes a cable 410 and a bearing layer 420 surrounding cable 410. As shown in FIG. 10, cable 410 may be a braided wire cable 410.

Bearing layer 420 is formed of one or more spiral wraps, such as a plurality of spiral wraps. The outer surface of the outermost spiral wrap 430 of the bearing layer 420 is abrasive-resistant, formed of a hard material, and forms a plurality of bearing surfaces 431 along the length of the bearing cable 400. The spiral wrap 430 may be formed of metal. To resist abrasion and provide a sliding surface for rollers, it may be advantageous for the outer surface of the outermost spiral wrap 430 to be smooth (i.e. having a regular consistency and free from projections). At least one of, and in some embodiments all of, the spiral wraps may each be formed of a single continuous piece extending along the length of the bearing portion 435.

Bearing cable 400 may include an impact absorption layer 425 disposed between the bearing layer 420 and braided wire cable 410. Bearing layer 420 interfaces with an outer surface of impact absorption layer 425, which interfaces with an outer surface of braided wire cable 410. Impact absorption layer 425 is formed of an impact absorbing, flexible material. In some embodiments, impact absorption layer 425 may be formed of hydraulic hose or UHMW (ultra high molecular weight polyethylene) tubing. Impact absorption layer 425 may be formed of one or more spiral wraps, such as a plurality of spiral wraps. The spiral wraps of the impact absorption layer 425 may be formed of plastic. At least one of, and in some embodiments all of, the spiral wraps of the impact absorption layer 425 may each be formed of a single continuous piece extending along the length of the bearing portion 435. Adjacent spiral wraps may be spiral in opposite directions. This may be advantageous to inhibit adjacent wraps from interlacing with each other.

Figure 11:
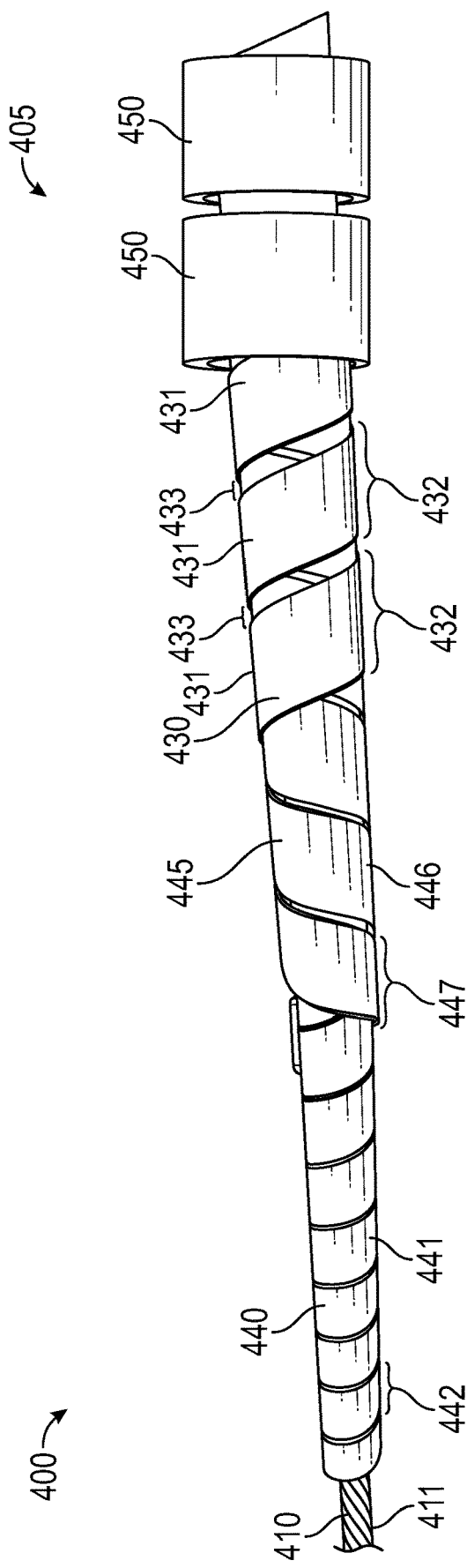
FIG. 11 is a schematic view of a portion of an embodiment of a catenary idler with a bearing cable.

FIG. 11 is a schematic view of a portion of an embodiment of a catenary idler 405 having a bearing cable 400 and a plurality of rollers 450 supported upon the bearing surfaces 431 of the bearing cable 400. The bearing surfaces 431 are integral to the bearing cable 400 such that they do not rotate with respect to the bearing cable 400. The bearing surface 431 provides a low-friction, sliding surface for rollers 450 that form the shape of the catenary idler 405. The bearing surfaces 431 also prevent direct contact with and wear on the braided wire cable 410 by the rollers 450.

For purposes of illustration, some of the plurality of rollers 450 and portions of bearing cable 400 in FIG. 11 have been removed to demonstrate otherwise obstructed features. Bearing layer 420 (shown in FIG. 10) surrounds impact absorption layer 425 (shown in FIG. 10), which surrounds braided wire cable 410. As shown in FIG. 11, bearing layer 420 includes spiral wrap 430, which is formed of metal and is abrasive-resistant. As shown in FIG. 11, impact absorption layer 425 includes first spiral wrap 440 and second spiral wrap 445.

Braided wire cable 410 includes an outer surface 411. First spiral wrap 440 includes an outer surface 441. Second spiral wrap 445 include an outer surface 446. The outer surface of the outermost spiral wrap 430 forms the plurality of bearing surfaces 431. Spiral wrap 430 is wrapped around the outer surface 446 of the second spiral wrap 445. A portion of spiral wrap 430 has been removed to illustrate the second spiral wrap 445. Second spiral wrap 445 is wrapped around the outer surface 441 of the first spiral wrap 440. A portion of second spiral wrap 445 has been removed to illustrate the first spiral wrap 440. First spiral wrap 440 is wrapped around the outer surface 411 of the braided wire cable 410. A portion of first spiral wrap 440 has been removed to illustrate the braided wire cable 410. First spiral wrap 440 and second spiral wrap 445 may be spiraled in opposite directions from each other. First spiral wrap 440 may be spiraled in a direction opposite from the direction of spiraling of the braided wire cable 410.

In some embodiments, braided wire cable 410 has an outer diameter of 0.625". First spiral wrap 440 may have a wall thickness of 0.08" to 0.1". When first spiral wrap 440 is wrapped around braided wire cable 410, the overall diameter is approximately 0.825". Second spiral wrap 445 may have a wall thickness of 0.110" to 0.125". When second spiral wrap 445 is wrapped around first spiral wrap 440, the overall diameter is approximately 1.075". The spiral wrap 430 of bearing layer 420 may have a steel spiral wrap having an inner diameter of approximately 1.06" and a wall thickness of 0.0375" to 0.045". When spiral wrap 430 is wrapped around second spiral wrap 445, the overall diameter is approximately 1.165".

When wrapping the spiral wrap 430, it is advantageous to minimize any gaps 433 between adjacent portions 432 of the spiral wrap 430 in order to provide a more continuous hard bearing surface 431. The use of spiral wrap may also be advantageous to allow for flex on the bottom side of the bearing cable 400 when a load is positioned on the top side of the bearing cable 400. Likewise, gaps between adjacent portions 442 of first spiral wrap 440 and gaps between adjacent portions 447 of second spiral wrap 445 may also be minimized.

Although this disclosure has been described in terms of certain preferred embodiments, other embodiments that are apparent to those of ordinary skill in the art, including embodiments that do not provide all of the features and advantages set forth herein, are also within the scope of this disclosure.

What is claimed is:

1. A catenary idler comprising:
   a braided wire cable having an outer surface;
   a bearing layer surrounding the braided wire cable, the bearing layer being formed of a spiral wrap, an outer surface of the spiral wrap forming a plurality of bearing surfaces disposed along a length of the braided wire cable; and
   a plurality of rollers each including an inner bore extending along a length of the roller, the plurality of rollers disposed over the plurality of bearing surfaces, the plurality of rollers being supported upon the plurality of bearing surfaces, the plurality of bearing surfaces providing contact surfaces for the inner bores of the plurality of rollers with the plurality of rollers being rotatable with respect to the plurality of bearing surfaces.

2. The catenary idler of claim 1, wherein the spiral wrap of the bearing layer is a metal spiral wrap.

3. The catenary idler of claim 2, wherein the spiral wrap of the bearing layer is a single continuous piece extending along the length of the braided wire cable.

4. The catenary idler of claim 1, further comprising an impact absorption layer positioned between the bearing layer and the outer surface of the braided wire cable.

5. The catenary idler of claim 4, wherein the impact absorption layer comprises a spiral wrap surrounding and contacting the outer surface of the braided wire cable.

6. The catenary idler of claim 5, wherein the spiral wrap of the impact absorption layer is a plastic spiral wrap.

7. The catenary idler of claim 6, wherein the spiral wrap of the bearing layer is a metal spiral wrap.

8. The catenary idler of claim 5, wherein the spiral wrap of the impact absorption layer is a first spiral wrap and the impact absorption layer further comprises a second spiral wrap surrounding and contacting the first spiral wrap, the second spiral wrap positioned between the first spiral wrap and the spiral wrap of the bearing layer.

9. The catenary idler of claim 8, wherein the first spiral wrap and the second spiral wrap are spiraled in opposite directions.

10. The catenary idler of claim 9, wherein the spiral wrap of the bearing layer and the second spiral wrap are spiraled in opposite directions.

11. The catenary idler of claim 1, wherein the braided wire cable is rotatably supported at a first end of the braided wire cable and at a second end of the braided wire cable.

12. The catenary idler of claim 1, wherein adjacent rollers of the plurality of rollers are independently rotatable from each other.

13. The catenary idler of claim 1, wherein the plurality of rollers are slidable with respect to the plurality of bearing surfaces along the length of the braided wire cable.

14. A method of configuring a catenary idler includes:
wrapping a spiral wrap of a bearing layer around a braided wire cable along a portion of a length of the braided wire cable, an outer surface of the spiral wrap of the bearing layer forming a plurality of bearing surfaces disposed along a length of the braided wire cable; and disposing a plurality of rollers over the plurality of bearing surfaces, the plurality of rollers each including an inner bore extending along a length of the roller, the plurality of bearing surfaces contacting the inner bores of the plurality of rollers with the plurality of rollers being rotatable with respect to the plurality of bearing surfaces.

15. The method of claim 14, further comprising disposing an impact absorption layer between the spiral wrap of a bearing layer and an outer surface of the braided wire cable.

16. The method of claim 15, wherein disposing the impact absorption layer comprises wrapping at least one spiral wrap of the impact absorption layer around the braided wire cable along the portion of the length of the braided wire cable.

17. The method of claim 16, wherein the at least one spiral wrap is a plurality of spiral wraps and the spiral wrap of the bearing layer is wrapped over an outermost wrap of the plurality of spiral wraps, and the method comprises wrapping the plurality of spiral wraps of the impact absorption layer around the braided wire cable by:

wrapping a first spiral layer around the braided wire cable, the first spiral layer contacting the outer surface of the braided wire cable; and wrapping at least one second spiral layer over the first spiral layer.

18. The method of claim 17, further comprising wrapping adjacent wraps of the plurality of spiral wraps of the impact absorption layer in opposite directions.

19. The method of claim 16, further comprising wrapping the spiral wrap of the bearing layer in a direction opposite from an outermost wrap of at least one spiral wrap of the impact absorption layer.

20. A conveying system comprising:
a frame;
a conveyor belt; and
a plurality of catenary idlers supported upon the frame, the conveyor belt being supported upon the plurality of catenary idlers, each of the plurality of catenary idlers comprising:

a braided wire cable having an outer surface;

an impact absorption layer having a first spiral wrap wrapped around and contacting the braided wire cable and a second spiral wrap wrapped around and contacting the first spiral wrap;

a bearing layer having a spiral wrap wrapped around and contacting the second spiral wrap of the bearing layer, an outer surface of the spiral wrap of the bearing layer forming a plurality of bearing surfaces disposed along a length of the braided wire cable; and a plurality of rollers each including an inner bore extending along a length of the roller, the plurality of rollers disposed over the plurality of bearing surfaces, the plurality of rollers being supported upon the plurality of bearing surfaces, the plurality of bearing surfaces providing contact surfaces for the inner bores of the plurality of rollers with the plurality of rollers being rotatable with respect to the plurality of bearing surfaces.

* * * * *